(12) United States Patent
Ozue et al.

(10) Patent No.: US 6,515,836 B2
(45) Date of Patent: Feb. 4, 2003

(54) MAGNETO-RESISTIVE EFFECT TYPE MAGNETIC HEAD AND MAGNETIC TAPE APPARATUS

(75) Inventors: Tadashi Ozue, Kanagawa (JP); Shinichi Fukuda, Kanagawa (JP); Toshio Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 09/876,405

(22) Filed: Jun. 7, 2001

(65) Prior Publication Data

US 2002/0021534 A1 Feb. 21, 2002

(30) Foreign Application Priority Data

Jun. 7, 2000 (JP) ........................................ 2000-171062

(51) Int. Cl.[7] ................................................. G11B 5/31
(52) U.S. Cl. ......................................... 360/313; 360/31
(58) Field of Search ................................. 360/313, 316, 360/324, 114.1, 31, 53, 55, 64; 324/210, 212, 226

(56) References Cited

U.S. PATENT DOCUMENTS 5,872,672 A * 2/1999 Chliwnyj et al. ............. 360/53
5,898,534 A * 4/1999 Gray ......................... 360/77.01
6,297,631 B1 * 10/2001 Ozue et al. ............... 29/603.09
6,369,982 B2 * 4/2002 Saliba ......................... 360/122
6,404,576 B1 * 6/2002 Hamaguchi et al. .......... 360/48

* cited by examiner

Primary Examiner—David Hudspeth
Assistant Examiner—Angel Castro
(74) Attorney, Agent, or Firm—Sonnenschein, Nath & Rosenthal

(57) ABSTRACT

A magneto-resistive effect type magnetic head (12) has a head width Wh greater than the track width Wt of a magnetic tape (5), as measured in the width direction of the tape (5). The head (12) has a magneto-resistive effect element, which has a magnetism-detecting section arranged at the prescribed azimuth angle. A signal reproduced from the magnetic tape as the head (12) is moved while off-tracked in the widthwise direction Wh of the recording track $T_1$. The signal has a specific characteristic that falls within a predetermined range for a reference value, provided that it has been generated from the magnetism the head (12) has detected over its effective width We.

20 Claims, 5 Drawing Sheets

MAGNETO-RESISTIVE EFFECT TYPE MAGNETIC HEAD AND MAGNETIC TAPE APPARATUS

RELATED APPLICATION DATA

The present application claims priority to Japanese Application No. P2000-171062 filed Jun. 7, 2000, which application is incorporated herein by reference to the extent permitted by law.

BACKGROUND OF THE INVENTION

1. Field of the Invention

The present invention relates to a magneto-resistive effect type magnetic head that reproduces the data recorded on a magnetic tape, and to a magnetic tape apparatus that has a magneto-resistive effect type magnetic head.

2. Related Art

Hard disc drives are known as magnetic disc apparatus that record and reproduce data on and from magnetic discs. Generally, a hard disc drive has a magneto-resistive effect type magnetic head (hereinafter referred to as "MR head"). The MR head has a width smaller than the width of the recording tracks of a magnetic disc. Note that the width of the MR head is measured in the widthwise direction of the recording tracks.

As shown in FIG. 1, the magnetic disc incorporated in a hard disc drive has concentric recording tracks $T_2$. A guard band 50 is provided between any two adjacent recording tracks $T_2$. As FIG. 1 shows, the MR head 51 provided in the hard disc drive is if SAL (Soft Adjacent Layer) type. The MR head 51 is subjected to on-track control and is thereby positioned within the width $W_0$ of a recording track $T_2$. The data-reproducing ability of the MR head 51 is evaluated by measuring the efficiency at which the MR head 51 reproduce data from the entire width $W_0$ of the recording track $T_2$.

It is proposed that an MR head of the type described above be applied to a magnetic tape apparatus such as a video tape recorder. The magnetic head incorporated in a magnetic tape apparatus is designed to record and record data on and from a magnetic tape, along a line inclined at a prescribed azimuth angle to the widthwise direction of the recording track of the magnetic tape. That is, the magnetic tape apparatus has a rotary head mechanism of so-called. "helical scan system," in order to record data on, and reproduce the same from the magnetic tape.

The rotary head mechanism used in the magnetic tape apparatus comprises an inductive magnetic head (hereinafter referred to as "inductive head"), an MR head, a rotary drum, a stationary drum, and a drive motor. The inductive head is provided to record data on a magnetic tape. The MR head is used to reproduce data from the magnetic tape. The rotary drum holds the inductive head and the MR head. The stationary drum supports the rotary drum, by using an axle. The drive motor is provided to rotate the rotary drum on the axle.

The inductive head comprises a magnetic core and a coil wound around the magnetic core. The magnetic core is composed of a pair of core halves, which constitute a closed magnetic path. The magnetic core has a magnetic gap that is very narrow. The MR head has a magneto-resistive effect element (hereinafter referred to as "MR element"). The rotary drum is a bottomed hollow cylinder made of metal. The axle supports the rotary drum, at the center of the bottom thereof. The inductive head and the MR head are secured to the outer circumferential surface of the rotary drum. The stationary drum is a bottomed hollow cylinder made of metal and supports the axle, allowing the same to rotate. Hence, the stationary drum holds the rotary drum by the use of the axle.

In the magnetic tape apparatus thus constructed, the magnetic tape runs, sliding on the outer circumferential surface of the rotary drum. The inductive head records data on the recording track of the running tape, along a line inclined at a prescribed azimuth angle to the widthwise direction of the recording track. As the magnetic tape runs, the MR head reads data from the recording track of the magnetic tape.

The efficiency at which the inductive head records data on the entire width of the recording track is measured, for example, right after the above-described magnetic tape apparatus is manufactured, thereby to evaluate the data-recording ability of the inductive head and the data-reproducing ability of the MR head.

As long as no external magnetic field is applied to the MR head from the magnetic tape, the MR head is magnetized usually at 45 degrees to the direction in which a sense current flows in the MR head. When an external magnetic field is applied to the MR head while a current is flowing from one end of the MR head to the other end thereof, the ends of the MR head are magnetized at different angles. That is, the MR head can no longer have uniform data-reproducing characteristic, depending upon the direction of easy magnetization. The data-reproducing characteristic of the MR head may fail to be uniform, too, unless the MR head is magnetized uniformly.

The MR head is inevitably more likely to exhibit non-uniform data-reproducing characteristic than the inductive head, depending on the position it takes in its widthwise direction that is parallel to the widthwise direction of the recording track. This fact must be taken into full consideration in evaluating the data-reproducing ability of the MR head.

The inductive head, which is incorporated in the rotary head mechanism, records data on a recording track, while writing the data over one side of the immediately adjacent track on which data has just been recorded. Thus, the azimuth angle for the recording track differs from the azimuth angle for the immediately adjacent recording track.

However, the inductive head may not be secured to the rotary drum with a sufficient positioning precision. If so, the inductive head is inevitably displaced with respect to the widthwise direction of a recording track. Consequently, adjacent recorded tracks will have different track widths $W_1$, $W_2$ and $W_3$, as is shown in FIG. 2. In other words, the magnetic tape will have recorded tracks that differ in terms of their widths.

As shown in FIG. 2, the MR head 55 may not be secured to the rotary drum with a sufficient positioning precision. In this case, the MR head 55 is displaced in its widthwise direction $W_2$ with respect to the width $W_1$ of the recorded track $T_3$. That is, the MR head 55 takes various positions A, B, C, D and E shown in FIG. 2, inevitably located off the track. If located so, the signals the MR head 55 reproduces at the positions A, B, C, D and E will differ from one another, when its data-reproducing characteristic is not uniform over the entire head width $W_2$. In other words, the MR head 55 exhibits a defect that the data reproducing characteristics vary depending on each position A, B, C, D and E.

In view of the above-described problems, it is necessary to evaluate the data-reproducing characteristics (hereinafter referred to as "micro-track characteristic") the MR head 55 exhibits at the off-track positions A, B, C, D and E which are off-tracked in the direction of the track width $W_2$ of the recording track $T_3$. Note that the MR head 55 reproduces data from the track $T_3$ on which data has been azimuth-recorded by helical-scan method.

The MR head, which is incorporated in the rotary head mechanism, is displaced in the widthwise direction of a recording track when the recorded tracks vary in width. Whenever the MR head is displaced in the widthwise direction of the track, its data-reproducing characteristic changes very much.

BRIEF SUMMARY OF THE INVENTION

Accordingly, an object of this invention is to provide a magneto-resistive effect type magnetic head that can reliably reproduce data from a magnetic tape.

Another object of the present invention is to provide a magnetic tape apparatus that can reliably reproduce data from a magnetic tape.

To attain the first-mentioned object, a magneto-resistive effect type magnetic head according to the invention comprises a magneto-resistive effect element for reproducing data recorded on a magnetic tape at a prescribed azimuth angle to the direction of width of a recording track of the magnetic tape. The magneto-resistive effect type magnetic head has a head width greater than the width of the recording track, as measured in the width direction of the recording track. The magneto-resistive effect element has a magnetism-detecting section arranged at the prescribed azimuth angle. The signal reproduced from the magnetic tape as the head is moved while off-tracked in the widthwise direction of the recording track has a specific characteristic value that falls within a predetermined range for a reference value within the predetermined range of the width direction of the bead.

The magneto-resistive effect type magnetic head reproduces data recorded on the magnetic tape at the prescribed azimuth angle to the direction of width of a recording track of the magnetic tape. The head is moved while off-tracked in the widthwise direction of the recording track, thereby reproducing a signal from the magnetic tape. The signal produced has a specific characteristic value that falls within a predetermined range for a reference value. Thus, the magneto-resistive effect type magnetic head can reproduce data at high reliability.

To attain the other object mentioned above, a magnetic tape apparatus according to the invention comprises a rotary drum in which a magneto-resistive effect type magnetic head that has a magneto-resistive effect element for reproducing data recorded on a magnetic tape at a prescribed azimuth angle to the direction of width of a recording track of the magnetic tape is provided rotatively. The magneto-resistive effect magnetic head has a head width greater than the width of the recording track, as measured in the width direction of the tape. The magneto-resistive effect element has a magnetism-detecting'section arranged at the prescribed azimuth angle. The signal reproduced from the magnetic tape as the head is moved while off-tracked in the widthwise direction of the recording track has a specific characteristic value that falls within a predetermined range for a reference value within the predetermined range of the width direction of the head.

In the magnetic tape apparatus, magneto-resistive effect type magnetic head reproduces data recorded on the magnetic tape at the prescribed azimuth angle to the direction of width of a recording track of the magnetic tape. The head is moved while off-tracked in the widthwise direction of the recording track, thereby reproducing a signal from the magnetic tape. The signal produced has a specific characteristic value that falls within a predetermined range for a reference value. Thus, the magneto-resistive effect type magnetic head can reproduce data at high reliability.

The magneto-resistive effect type magnetic head according to the present invention can be quantitatively evaluated for its data-reproducing ability. The data-reproducing ability thus evaluated is high, and the magnetic head can therefore reproduce data at high reliability.

The magnetic tape apparatus according to the present invention has a magneto-resistive effect type magnetic head that can be quantitatively evaluated for its data-reproducing ability. Therefore, the apparatus can reproduce data from magnetic tapes, at high reliability.

DETAILED DESCRIPTION OF THE INVENTION

An embodiment of the present invention will be described, with reference to the accompanying drawings. The embodiment is a magnetic tape apparatus that comprises a magneto-resistive effect type magnetic head.

Figure 3:
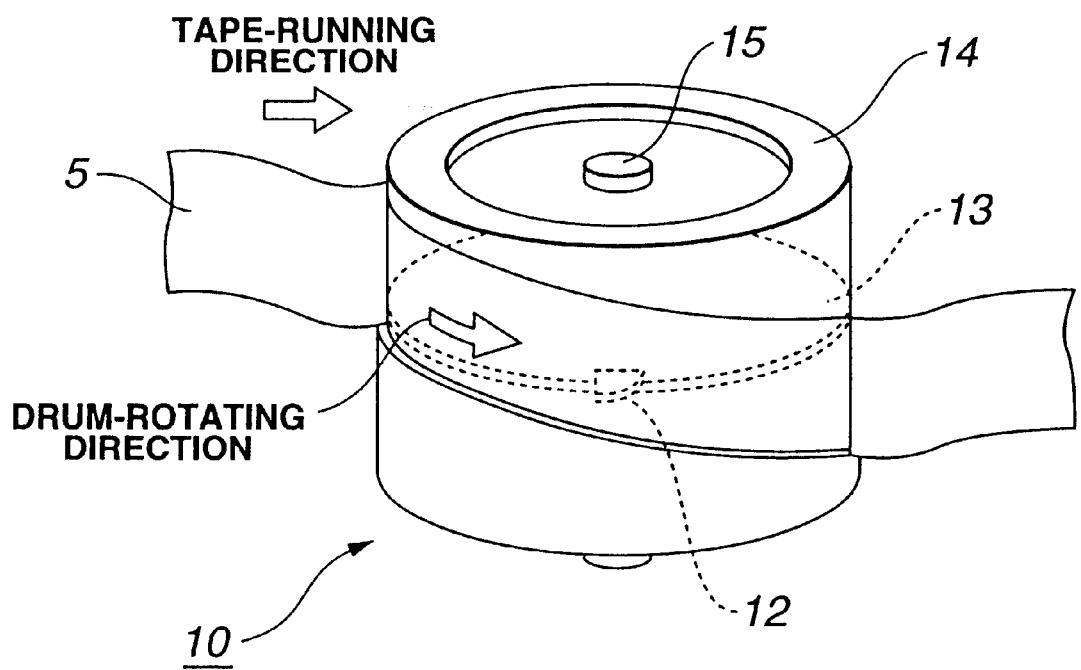
FIG. 3 is a perspective view of the rotary head mechanism provided in a magnetic tape apparatus according to the present invention.

The magnetic tape apparatus according to the invention comprises a rotary head mechanism and a tape drive mechanism. The rotary head mechanism is designed to record and reproduce data on and from a magnetic tape. The tape drive mechanism is provided to run the magnetic tape with respect to the-rotary head mechanism. As FIG. 3 shows, a rotary head mechanism 10 comprises an inductive magnetic head (not shown, hereinafter referred to as "inductive head"), a magneto-resistive effect type magnetic head 12 (hereinafter referred to as "MR head"), a rotary drum 13, a stationary drum 14, an axle 15, and a drive motor (not shown). The inductive head records data on a magnetic tape 5. The MR head 12 reproduces data from the magnetic tape 5. The rotary drum 13 holds the inductive head and the MR head 12. The stationary drum 14 surrounds the rotary drum 13.

The axle 15 supports the rotary drum 13 to the stationary drum 14. The drive motor is provided to rotate the rotary drum 13.

Figure 4:
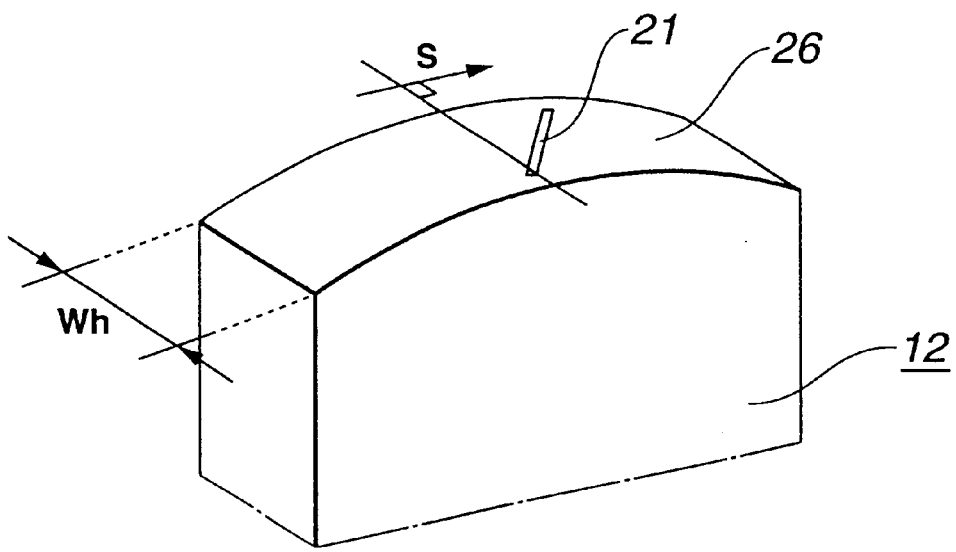
FIG. 4 is a perspective view of the magneto-resistive effect type magnetic head incorporated in the magnetic tape apparatus shown in FIG. 3.
Figure 5:
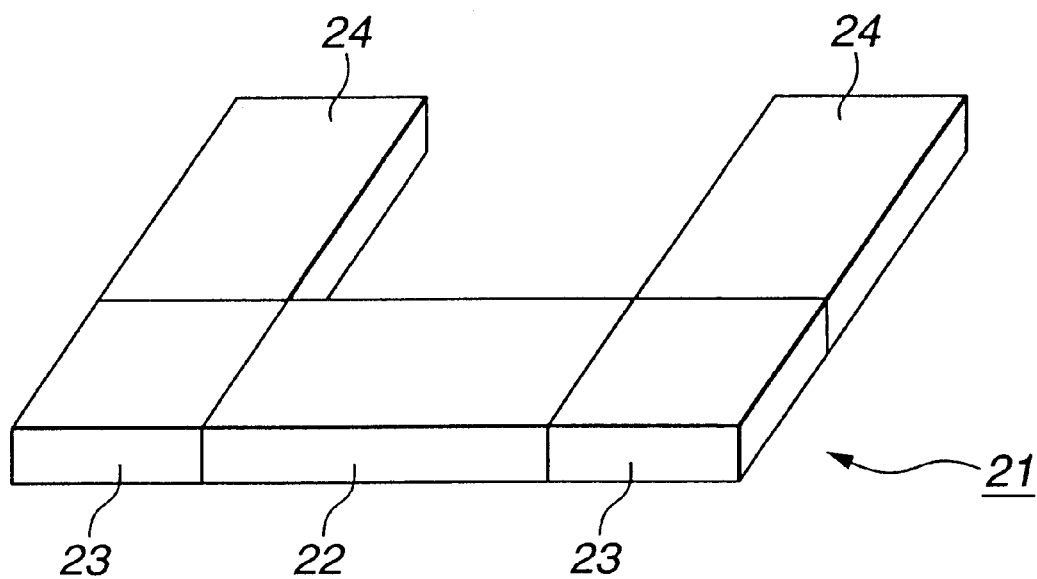
FIG. 5 is a perspective view of the magneto-resistive effect element provided in the magneto-resistive effect magnetic head of FIG. 4.

As FIG. 4 shows, the MR head 12 has a magneto-resistive effect element 21 (hereinafter referred to as "MR element"). As illustrated in FIG. 5, the MR element 21 comprises an MR film 22, two hard films 23, and two electrodes 24. The MR film 22 is interposed between and connected to the hard films 23, which are permanent magnets. The two electrodes 24 are connected to the two hard films 23, respectively, The electrodes 24 apply a horizontal bias to the MR film 22 through the hard films 23.

Figure 6:
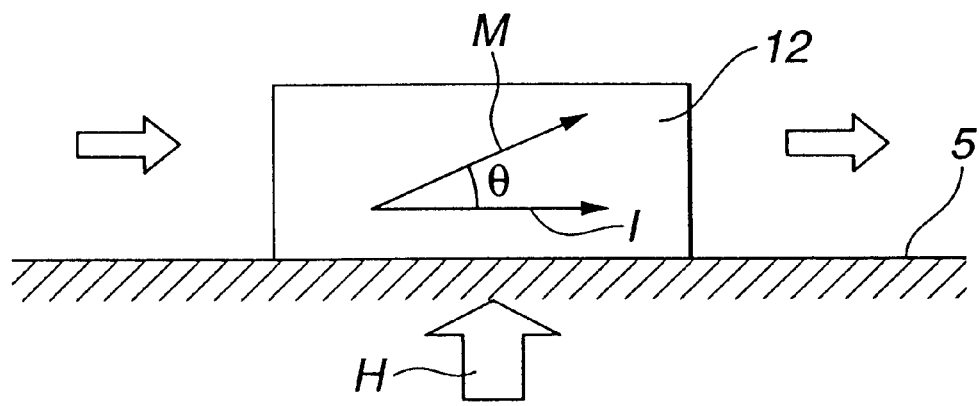
FIG. 6 is a diagram for explaining the operating principle of the magneto-resistive effect element illustrating in FIG. 5.

As may be seen from FIG. 6, the MR element 21 has an anisotropic magneto-resistive effect. When the external magnetic field H emanating from the magnetic tape 5 is applied to the sense current I flowing in the MR element 21, it changes the angle $\theta$ at which the easy magnetization axis M is inclined to the direction in which the sense current I is flowing. The electrical resistance of the MR element 12 changes in accordance with the angle $\theta$, i.e., magnetization angle. A voltage change is detected from the electrical resistance and the sense current I, thereby reproducing the data recorded on a recording track of the magnetic tape 5.

Figure 7:
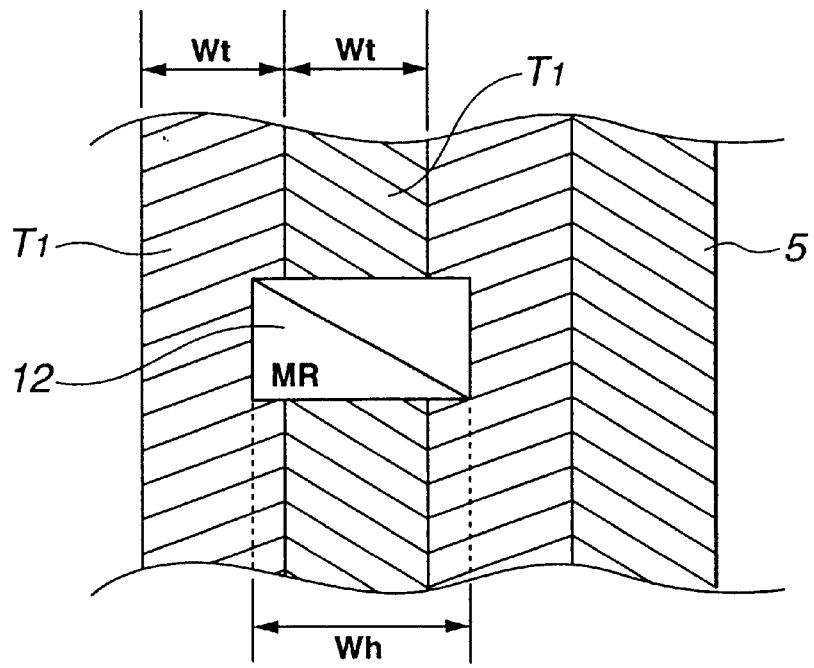
FIG. 7 is a schematic view of a magnetic tape, illustrating the width of the magneto-resistive effect type magnetic head.

As shown in FIG. 4, the MR head 12 has a sliding surface 26 that scans a recording track of the magnetic tape 5. The MR element 21 is mounted on the sliding surface 26. The MR element 21 has a head width Wh as measured in a direction that is parallel to the direction of the track width Wt, which extends at right angles to the scanning direction S of the recording track $T_1$. As shown in FIG. 7, the head width Wh is greater than the width Wt of the recording track $T_1$ of the magnetic tape 5.

The inductive head comprises a magnetic core (not shown) and a coil wound (not shown) around the magnetic core. The magnetic core is composed of a pair of core halves, which constitute a closed magnetic path. The magnetic core has a magnetic gap that is very narrow.

The rotary drum 13 is bottomed hollow cylinder made of metal. The bottom has a hole (not shown) cut in its central part. The axle 15 extends, passing through the hole. The rotary drum 13 holds the inductive head and the MR head 12 on its outer circumferential surface. The inductive head and the MR head 12 protrude a little from the outer circumferential surface of the rotary drum 13.

The stationary drum 14 is a bottomed hollow cylinder that is made of metal. The bottom has a hole (not shown) cut in its central part. The axle 15 extends, passing through the hole of the rotary drum 13 and the stationary drum 14 and can rotate with respect to the stationary drum 14. The rotary drum 13 is fixed to the middle part of the axle 15, which is connected to the drive motor (not shown). Thus, the rotary drum 13 is rotated against the stationary drum 14 by the drive motor.

The inductive head records data on the recording track $T_1$, while writing the data over one side of the immediately adjacent track $T_1$ on which data has just been recorded. Thus, the azimuth angle for the recording track differs from the azimuth angle for the immediately adjacent recording track.

The MR head 12 is located off the track $T_1$, in the direction of the width Wt of the track $T_1$, and reproduces data from the recording track $T_1$. Thus, the characteristics (hereinafter referred as "micro-track characteristics") of the signal MR head 12 produces can fall within a prescribed range for a reference value, over a predetermined part of the head width Wh, which will be referred to as "effective head width We."

Figure 8:
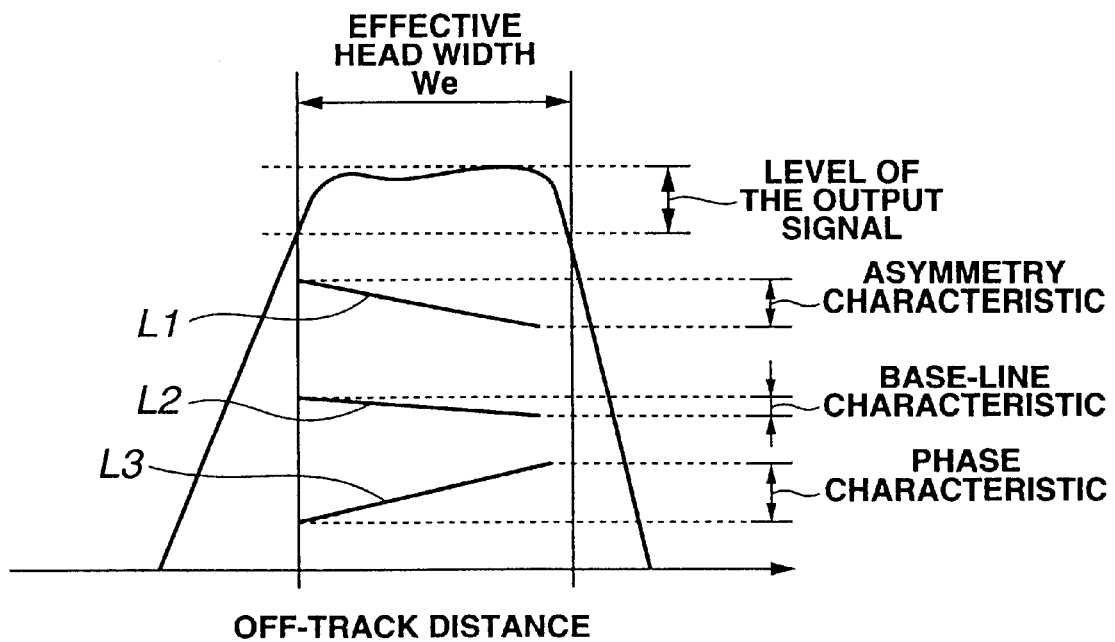
FIG. 8 is a graph for explaining the micro-track characteristic of the magneto-resistive effect type magnetic head.

Various micro-track characteristics that should be measured to evaluate the data-reproducing ability of the MR head 12 will be explained, with reference to FIG. 8. In FIG. 8, plotted on the abscissa is the off-track distance for which the MR head 12 may be displaced in the direction of its width Wh, with respect to the width Wt of the recording track $T_1$.

As shown in FIG. 8, a micro-track characteristic can be determined from, for example, the magnitude of the output signal of the MR head 12. The magnitude of the output signal should fall within a range of 1 dB from a peak value. From this micro-track characteristic there is determined the effective head width We, over which the level of the output signal falls within a specific range for the reference value. Thus, the width We of that part of the MR head 12, which serves to reproduce data, is defined.

Another micro-track characteristic is characteristic $PW_{50}$. This micro-track characteristic is the pulse width PW50 that the output signal has at 50% of its peak value.

Still another micro-track characteristic is the asymmetry characteristic of the output signal. The asymmetry characteristic is indicated by a line L1 shown in FIG. 8, obtained for the effective head width We. This characteristic should be 10% or less at both ends of the effective head width We.

Another micro-track characteristic is a base-line shift characteristic, which is indicated by a line L2 in FIG. 8. The base-line shift characteristic is a change of the reference value of the output signal. A line L3 in FIG. 8 indicates a further micro-track characteristic, i.e., the phase characteristic of the output signal. The phase characteristic is defined so that the phase difference between the phases at the ends of the effective head width We may be 10° or less. Still another micro-track characteristic is the wavelength characteristic of the output signal, which falls within a prescribed range from a reference wavelength.

Figure 1:
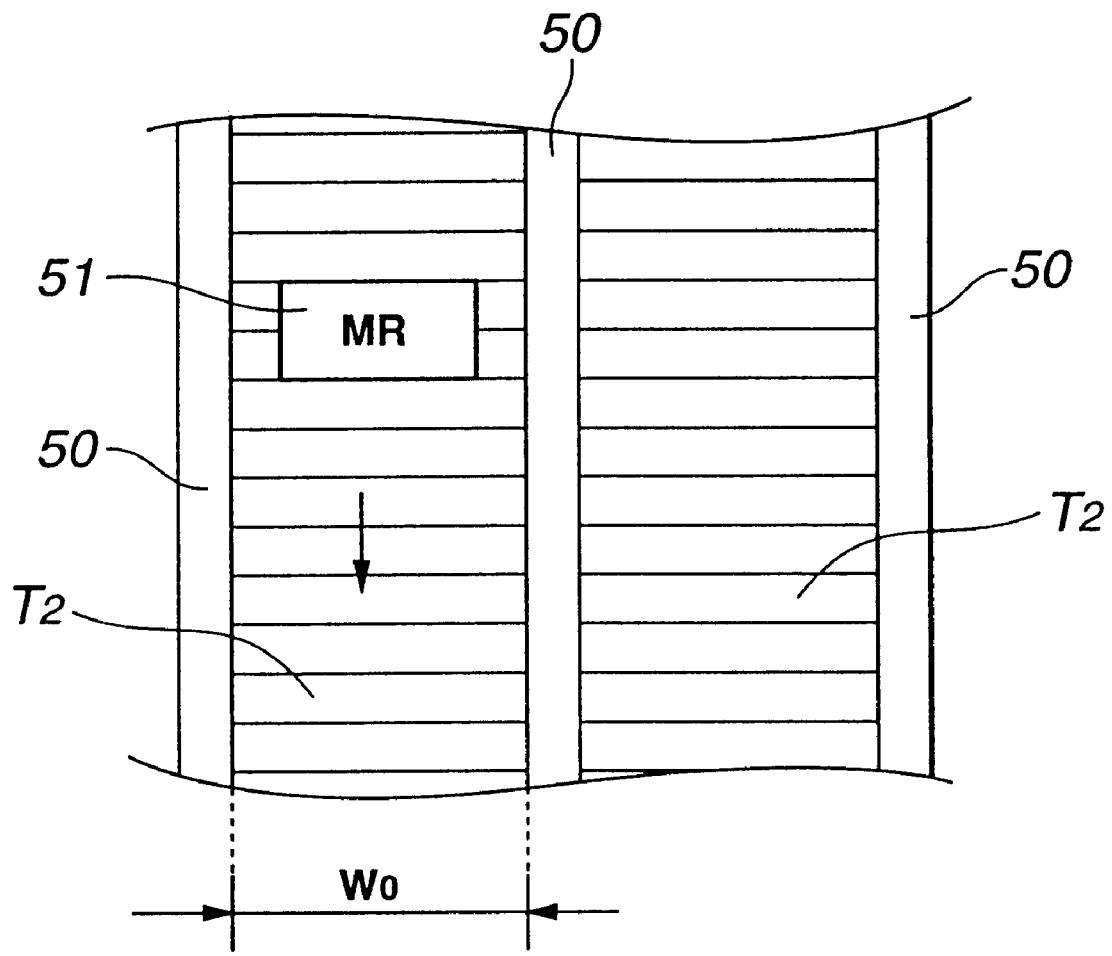
FIG. 1 is a diagram explaining the operation of the magneto-resistive effect type magnetic head incorporated in a conventional hard disc drive.
Figure 2:
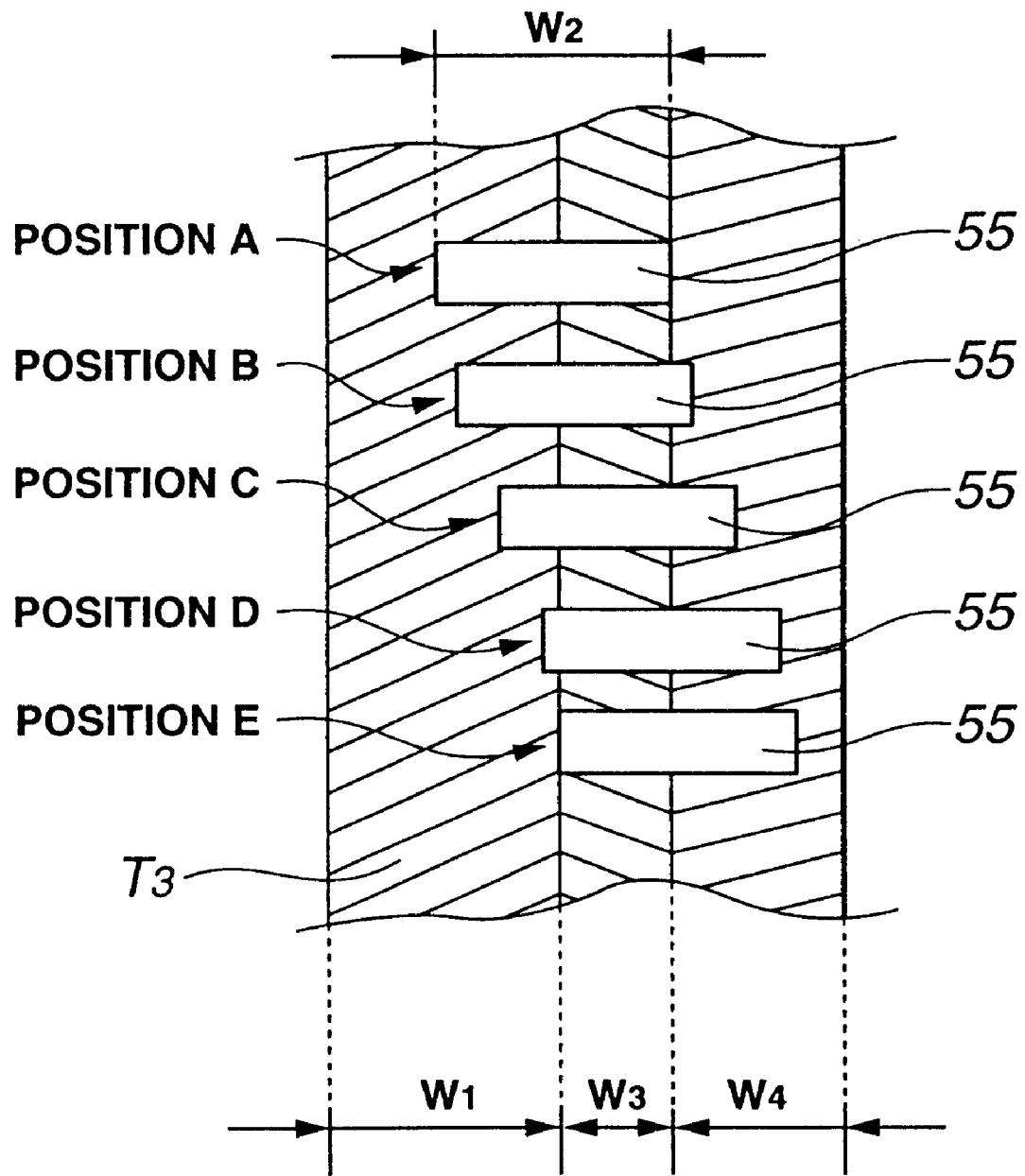
FIG. 2 is a diagram for explaining the track width of the recording track recorded on the magnetic tape, and positions of magneto-resistive effect magnetic head for scanning the recording tracks.

The inductive head may be off-tracked in the direction of track width $W_0$ of the recording track $T_2$, as is illustrated in FIG. 2 (prior art). In this case, the width $W_0$ of the recording track $T_2$ reduces to a minimum. A micro-track characteristic may be acquired for any track that has a width smaller than the minimum value. This enables the inductive head to record data with sufficient reliability.

How the magnetic tape apparatus records and reproduces data on and form the magnetic tape 5 will be described. In the magnetic tape apparatus, the tape drive mechanism makes the magnetic tape 5 run, sliding in a helical direction on the outer circumferential surface of the rotary drum 13. As the rotary drum 13 is rotated, the inductive head moves along the inner circumferential surface of the stationary drum 14, with its magnetic gap facing the magnetic tape 5. Thus, the inductive head records data on the magnetic tape 5, more precisely on a recording track having a width Wt and along a line inclined at a prescribed azimuth angle to the widthwise direction of the track. Similarly, the magnetic tape apparatus reproduces data recorded on the recording track $T_1$ of the magnetic tape, with the MR head facing the recording track of the magnetic tape 5.

The micro-track characteristics of the MR head 12, i.e., pulse-width characteristic, asymmetry characteristic, base-line shift characteristic, phase characteristic, wavelength characteristic and the like, can be evaluated for the effective head width determined by the magnitude of the output signal the MR head 12 has reproduced from the tape 5, which enables the MR head to be quantitatively evaluated. The data-reproducing characteristic of the MR head. 12 can be determined from these micro-track characteristics. The data-reproducing characteristic is good, imparting sufficient operating reliability to the MR head 12.

As has been described, the MR head 12 incorporated in the magnetic tape apparatus has a specific effective head width We for reproducing data that has been azimuth-recorded on a recording track of the magnetic tape 5 by means of a helical scanning. In addition, the data-reproducing characteristic of the MR head can be defined by various micro-track characteristics and, can therefore be evaluated quantitatively Hence, the MR head 12 and the magnetic tape apparatus having the MR head 12 can have high data-reproducing reliability.

The embodiment described above incorporates a magneto-resistive effect magnetic (MR) head 12. Nonetheless, any other type of a magnetic head, such as a gigantic magneto-resistive effect type magnetic head (GMR head) or a tunnel magnetic head (TMR head), may be used in place of the MR head 12. The magnetic tape apparatus according to the invention is fit for use in magnetic tape video cameras and video tape recorders.

What is claimed is:

1. A magneto-resistive effect type magnetic head which comprises a magneto-resistive effect element for reproducing data recorded on a magnetic tape at a prescribed azimuth angle to the direction of width of a recording track of the magnetic tape, wherein the magneto-resistive effect magnetic head has a head width greater than the width of the recording track, as measured in the width direction thereof, and the magneto-resistive effect element has a magnetism-detecting section arranged at the prescribed azimuth angle; and a signal reproduced from the magnetic tape as the head is moved while off-tracked in the widthwise direction of the recording track has a specific characteristic value that falls within a predetermined range for a reference value within the predetermined range of the width direction of the head.

2. The magneto-resistive effect type magnetic head according to claim 1, wherein the signal is reproduced from a specific recording track that has a width equal to or smaller than the width at which the magnetic head is off-tracked in the widthwise direction of the recording track.

3. The magneto-resistive effect type magnetic head according to claim 1, wherein the specific characteristic value is obtained from magnitude of the signal reproduced from the magnetic tape.

4. The magneto-resistive effect type magnetic head according to claim 1, wherein the specific characteristic value is obtained from a wavelength characteristic of the signal reproduced from the magnetic tape.

5. The magneto-resistive effect type magnetic head according to claim 1, wherein the specific characteristic value is obtained from a pulse-width characteristic of the signal reproduced from the magnetic tape.

6. The magneto-resistive effect type magnetic head according to claim 1, wherein the specific characteristic value is obtained from an asymmetry characteristic of the signal reproduced from the magnetic tape.

7. The magneto-resistive effect type magnetic head according to claim 1, wherein the specific characteristic value is obtained from a baseline shift characteristic of the signal reproduced from the magnetic tape.

8. The magneto-resistive effect type magnetic head according to claim 1, wherein the specific characteristic is obtained from a phase characteristic of the signal reproduced from the magnetic tape.

9. The magneto-resistive effect type magnetic head according to claim 1, wherein the specific characteristic value is obtained from another characteristic that has been detected from a part of the magnetic head, which extends in the widthwise direction for a distance specified by measuring the at least one of characteristics value including the magnitude, wavelength characteristic, pulse-width characteristic, asymmetry characteristic, base-line shift characteristic and phase characteristic of the signal reproduced from the magnetic tape.

10. The magneto-resistive effect type magnetic head according to claim 9, wherein said part of the magnetic head is broader than the track pitch of the magnetic tape.

11. A magnetic tape apparatus comprising a rotary drum in which a magneto-resistive effect type magnetic head that has a magneto-resistive effect element for reproducing data recorded on a magnetic tape at a prescribed azimuth angle to the direction of width of a recording track of the magnetic tape is provided rotatively, wherein the magneto-resistive effect type magnetic head has a head width greater than the width of the recording track, as measured in the width direction thereof, and the magneto-resistive effect element has a magnetism-detecting section arranged at the prescribed azimuth angle; and a signal reproduced from the magnetic tape as the head is moved while off-tracked in the widthwise direction of the recording track has a specific characteristic value that falls within a predetermined range for a reference value within the predetermined range of the width direction of the head.

12. The magnetic tape apparatus according to claim 11, wherein the signal is reproduced from a specific recording track that has a width equal to or smaller than the width at which the magnetic head is off-tracked in the widthwise direction of the recording track.

13. The magnetic tape apparatus according to claim 11, wherein the specific characteristic is obtained from magnitude of the signal reproduced from the magnetic tape.

14. The magnetic tape apparatus according to claim 11, wherein the specific characteristic is obtained from a wavelength characteristic of the signal reproduced from the magnetic tape.

15. The magnetic tape apparatus according to claim 11, wherein the specific characteristic is obtained from a pulse-width characteristic of the signal reproduced from the magnetic tape.

16. The magnetic tape apparatus according to claim 11, wherein the specific characteristic is obtained from an asymmetry characteristic of the signal reproduced from the magnetic tape.

17. The magnetic tape apparatus according to claim 11, wherein the specific characteristic is obtained from a base-line shift characteristic of the signal reproduced from the magnetic tape.

18. The magnetic tape apparatus according to claim 11, wherein the specific characteristic is obtained from a phase characteristic of the signal reproduced from the magnetic tape.

19. The magnetic tape apparatus according to claim 11, wherein the specific characteristic is obtained from another characteristic that has been detected from a part of the magnetic head, which extends in the widthwise direction for a distance specified by measuring the at least one of characteristics including the magnitude, wavelength characteristic, pulse-width characteristic, asymmetry characteristic, base-line shift characteristic and phase characteristic of the signal reproduced from the magnetic tape.

20. The magnetic tape apparatus according to claim 19, wherein said part of the magnetic head is broader than the track pitch of the magnetic tape.

* * * * *